United States Patent

Heitmann

[11] Patent Number: 6,041,156
[45] Date of Patent: Mar. 21, 2000

[54] OPTICAL CONNECTION

[75] Inventor: Walter Heitmann, Gross-Bieberau, Germany

[73] Assignee: Deutsche Telekom AG, Bonn, Germany

[21] Appl. No.: 09/143,132

[22] Filed: Aug. 28, 1998

[30] Foreign Application Priority Data

Aug. 28, 1997 [DE] Germany ............................ 197 37 498

[51] Int. Cl.[7] .................................................. G02B 6/00
[52] U.S. Cl. ............................................................ 385/139
[58] Field of Search .................................. 385/39, 63, 73, 385/123, 139, 140, 147

[56] References Cited

U.S. PATENT DOCUMENTS

| 4,868,004 | 9/1989 | Ziiltxke et al. | 427/42 |
|---|---|---|---|
| 5,170,458 | 12/1992 | Aoyagi et al. | 385/127 |
| 5,661,328 | 8/1997 | Itatani et al. | 385/120 |
| 5,680,412 | 10/1997 | DeMaria et al. | 372/92 |
| 5,945,227 | 4/1999 | Itatani et al. | 438/69 |

OTHER PUBLICATIONS

M.A. Scobey et al., "Passive DWDM components using MicroPlasma® optical interference filters" OFC'96 Technical Digest. 1996. pp. 243–243. (No month).

R. Henking et al., "Ion–Beam–Sputtering: A Deposition Process for Laser Components of the Future" Feb. 29, 1996. pp. 43–49.
F. Richter "Superharte dünne Schichten" Phys. Bl.52 (1996) Nr. 4. pp. 355–358. (No month).
Norbert Kaiser "Interference coatings for the ultraviolet spectral region" Laser–Optik, Jan., 1996. pp. 52–60.
Toshihiro Shinataku et al. "Highly Stable Physical–Contact Optical Fiber Connectors with Spherical Convex Ends" Journal Of Lightwave Technology, vol. 11 No. 2, Feb. 1993. pp. 241–248.

Primary Examiner—Akm E. Ullah
Attorney, Agent, or Firm—Kenyon & Kenyon

[57] ABSTRACT

An optical connection between optical fibers and an optical window exhibits improved long-term stability and improved measuring accuracy due to substantial transmission constancy. The surface of the optical window is coated with a thin, absorption-free coating of very hard material, thereby substantially improving the scratch resistance. The thickness of the protective coating is sized so that interfering reflection losses caused by differences in refraction indices may be avoided. The hardness of the protective coating is greater than that of the material of the optical window and its optical thickness is small in relation to the operating wavelength. The coating may be applied using ion-based, ion-beam dispersion, or microplasma methods.

10 Claims, 1 Drawing Sheet

OPTICAL CONNECTION

FIELD OF THE INVENTION

The present invention relates to an optical connection between an optical fiber and an optical window.

RELATED TECHNOLOGY

Optical connections, in particular connectors, are known and widely used in telecommunication engineering. Known connectors having one optical fiber, two optical fibers, for example for home wiring or electronic data processing systems, or having four to twenty-four optical fibers, are used both for data and information transmission, as well as for video and voice transmission. The fiber optic connectors are constructed based on the following principle: The optical fiber with a typical external diameter of 125 μm is fixed in position in the center of a hard metal or ceramic connector pin having a diameter of 2.5 mm or 1.25 mm. At the front end of the pin, the end face of the optical fiber is polished to a spherical cap-like structure and projects out somewhat. The pins are joined with a high degree of precision using a cylindrical ferrule so that any offset of the fiber cores is less than 1 μm. The insertion is carried out with a small contact pressure, causing the spherical caps to flatten in the middle. When working with clean end faces, an optical contact is formed that exhibits little junction loss and very little back reflection. A detailed description of the fundamentals and manufacture of optical connectors is published in T. Shintaku et al., "Highly Stable Physical-Contact Optical Fiber Connectors with Spherical Convex Ends," Journal of Lightwave Technology 11, 2 (1993) 241.

In various optical connector applications, for example in metrology, where the mechanical stability of an interface is low because the interface is made of a relatively soft material, such as quartz glass, glass or plastic, the transmission may be disturbed and changed. In metrological applications, to measure fiber parameters, such as attenuation, the end face of a fiber may be placed on an optical window in front of a light source or an optical detector. In these applications, in particular, there is a need to improve the mechanical stability of the interface of the optical window upon which the fiber is placed. To avoid disturbance-causing reflections, the window is generally fabricated from the same material as the fiber, and the refractive index adaption between the fiber end face and the window surface is optimized using a medium having the same refractive index, such as immersion oil or immersion gel.

When the fiber is placed on the window surface, impurities on the interfaces, such as dust particles or burrs on the fiber end surface, lead to damage, usually in the form of scratches. Such damage on the window surface in the area irradiated by the measuring light distort the measuring results and thereby constitute a metrological problem.

SUMMARY OF THE INVENTION

An object of the present invention is to improve the optical connection between optical fibers and optical windows. As used in metrological applications in particular, harmful variations in transmission may be avoided, and a greater measuring accuracy and improved long-term stability may be achieved.

The present invention provides an optical connection, or contact surfaces between the surface of an optical window and the end face of an optical fiber, characterized in that the surface of the optical window is provided with a thin, absorption-free protective coating of a hardness that is greater than that of the optical fiber material and whose optical thickness is small in comparison to the operational wavelength. The optical connection may be provided, for example, for measuring purposes.

The mechanical stability of the window surface is substantially improved in that a hard, thin layer of $Al_2O_3$ (sapphire) or of other similar hard substances is applied, without any disturbing increase in reflection occurring.

BRIEF DESCRIPTION OF THE DRAWING

The present invention is now explained with reference to an embodiment shown in.

DETAILED DESCRIPTION

Figure 1:
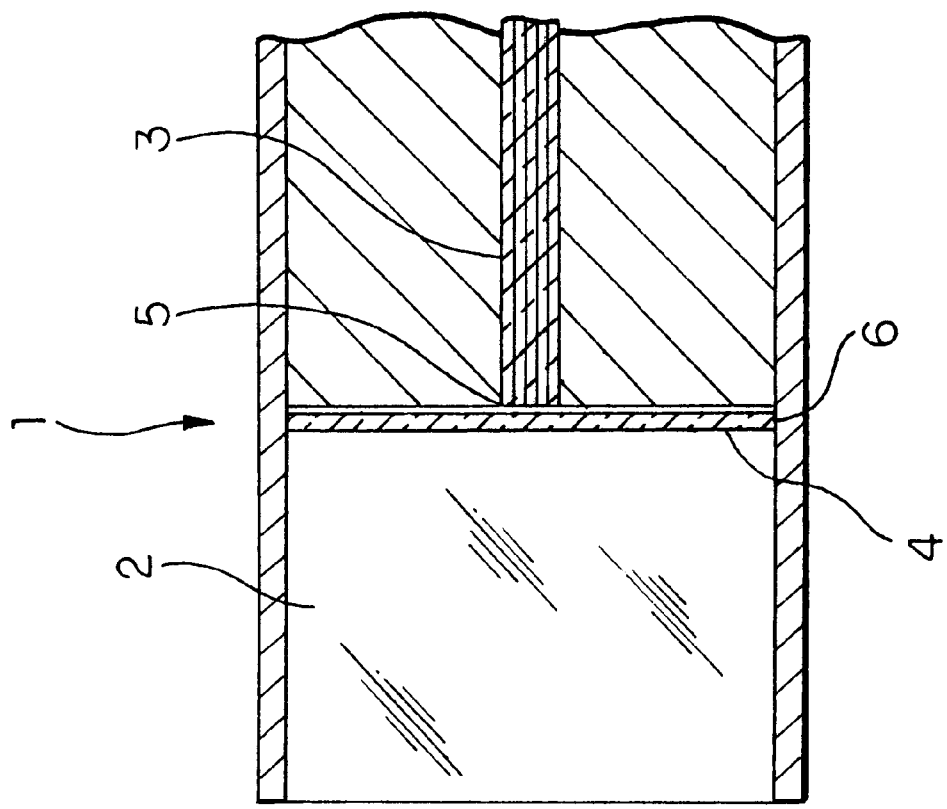
FIG. 1, which shows schematically a side view of part of a connection according to the present invention, although not to scale for purposes of clarity.

The following will describe an embodiment of the present invention, specifically for a metrology application:

FIG. 1 shows optical connection 1 between surface 4 of optical window 2 and end face 5 of optical fiber 3. End face 5 is provided with coating 6. Coating 6 is thin, absorption-free, has a hardness greater than that of optical fiber, and has an optical thickness which is small in comparison to the operating wavelength. It should be understood that a plurality of optical fibers 3 may be provided. The thickness of coating 6 is such that interfering reflection losses due to differences in the refraction indices are largely avoided.

In order to measure the fiber parameters such as, for example, attenuation, of optical fibers the end faces of a fiber may be placed upon an optical window in front of a light source or an optical detector. When in such a situation a window in accordance with the connection of the present invention is used, the mechanical stability of the window surface is substantially improved. This is achieved by application of a hard, very thin, protective coating made of corundum ($Al_2O_3$) or of other similar hard substances. In this way, the optical connection between an optical waveguide or fiber and an optical window is achieved without any interference-causing increase in reflections and without changes in transmission caused by damage to the window surface. Substantially more accurate measuring results may thereby be achieved. It should be emphasized, however, that the present invention is not only limited to such measuring arrangement applications. The present invention is applicable to any optical contact surface between a top surface of an optical window and an end face of an optical waveguide or optical fibers.

Besides $Al_2O_3$, absorption-free substances having an even greater hardness are suitable for use as the protective coating of the present invention. Suitable oxides are, among others, $Y_2O_3$, $Sc_2O_3$, $ZrO_2$, and $HfO_2$, as proceed from N. Kaiser, "Dünne Schichten für den ultravioletten Spektralbereich" (Thin Coatings for the Ultraviolet Spectral Region), Laser und Optoelektronik (Lasers and Optoelectronics) 28, 2 (1996) 52. F. Richter, "Superharte dünne Schichten" (Superhard Thin Coatings), Physikalische Blätter (Pages from Physics) 52, 4 (1996) 355", indicates a number of substances, such as nitrides, borides und carbides, whose hardness is between that of $Al_2O_3$ and that of diamonds.

The protective coating may be fabricated, or the appropriate materials may be applied, using ion-based methods, ion-beam dispersion, or using known microplasma methods.

Among others, the following methods may be used: ion-based methods as described in the N. Kaiser and the F. Richter publications cited above; ion beam dispersion methods, such as described in R. Henking et al., "Ionentrahl-Zerstäuben: Ein Beschichtungsverfahren für Laserkomponenten der Zukunft" (Ion Beam Dispersion: A Coating Method for Laser Components of the Future), Laser und Optoelektronik (Laser and Optoelectronics) 28, 2 (1996) 43; or the microplasma method described in M. A. Scobey et al., "Passive DWDM Components Using Microplasma Optical Interference Filters", Optical Fiber Conference OFC 1996, Thk 1242.

Because the window surfaces are coated with a thin, absorption-free coating of a very hard material, the scratch resistance of the optical window surface is substantially enhanced. The protective coating is thin enough that interfering reflection losses due to differences in the refractive indices are substantially avoided. Also, the fiber ends applied to the optical window are no longer able to scratch the surface of the optical window.

The coating process is relatively short in duration due to the thinness of the protective coating. The protective coating can also be made of an absorption-free, inorganic or organic material of considerable hardness when the optical window is made of plastic. The protective coating for an optical window or the like made of quartz glass can also contain oxides, nitrides, borides or carbides. The optical thickness of the protective coating is between $1/1000$ and $1/10$ of the operational wavelength. To avoid reflection losses due to differences in refraction, it is very beneficial for the thickness of the protective coating to be as small as possible.

Because the surface of the optical window is provided with a hard, reflection-free, thin protective coating, impurities present when the fiber is placed on the interface surface, or burrs on the cut-off fiber end face, no longer lead to damage.

What is claimed is:

1. An optical connection for use in an optical fiber system having an operating wavelength, the optical connection comprising:

at least one optical fiber having an end face and an optical fiber hardness;

an optical window having a surface disposed opposite the optical fiber end face; and a thin, absorption-free protective coating at the optical window surface, the protective coating having a hardness greater than the optical fiber hardness and having an optical thickness small compared to the operating wavelength.

2. The optical connection as recited in claim 1 wherein the optical connection is a part of a measurement device.

3. The optical connection as recited in claim 1 wherein the at least one optical fiber is made of quartz glass and the protective coating is made of corundum.

4. The optical connection as recited in claim 1 wherein the at least one optical fiber is made of quartz glass and the protective coating is made of at least one of oxides, nitrides, borides and carbides.

5. The optical connection as recited in claim 1 wherein the optical window is made of quartz glass, multicomponent glass or plastic and the protective coating is made of a very hard inorganic or organic absorption-free material.

6. The optical connection as recited in claim 1 wherein the optical thickness of the protective coating is between $1/1000$ and $1/10$ of the operating wavelength or of a measuring wavelength.

7. The optical connection as recited in claim 1 wherein the protective coating is made of a very hard material, a thickness of the protective coating being suitably small to avoid interfering reflection losses due to differences in refraction indices.

8. The optical connection as recited in claim 1 wherein the protective coating is made of at least one oxide.

9. The optical connection as recited in claim 8 wherein the at least one oxide is at least one of $Y_2O_3$, $Sc_2O_3$, $ZrO_2$, and $HfO_2$.

10. The optical connection as recited in claim 1 wherein the protective coating is applied by at least one of an ion-based process, an ion-beam dispersion process, and a microplasma process.

* * * * *